Figure 2:
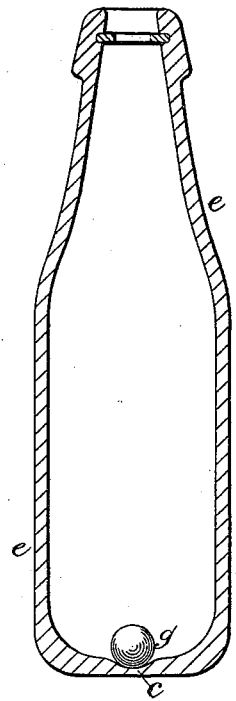

(No Model.)

H. BARRETT.
Bottle and Stopper.

No. 240,222.        Patented April 19, 1881.

Witnesses:
Pennington Halsted
George Cornell.

Inventor:
Henry Barrett
by John J. Halsted
his Atty.

UNITED STATES PATENT OFFICE.

HENRY BARRETT, OF HAMPTON, COUNTY OF MIDDLESEX, ENGLAND.

BOTTLE AND STOPPER.

SPECIFICATION forming part of Letters Patent No. 240,222, dated April 19, 1881.

Application filed August 24, 1880. (No model.) Patented in England September 30, 1879.

*To all whom it may concern:*

Be it known that I, HENRY BARRETT, of Hampton, in the county of Middlesex, England, have invented new and useful Improvements in Bottles and Stoppers, (for which I have obtained a patent in Great Britain, No. 3,935, bearing date September 30, 1879, and sealed December 23, 1879,) of which the following is a specification.

This invention relates to the improvements hereinafter described in internal stoppers for bottles for containing aerated or gaseous liquids, (applicable, also, for bottles containing beer and other malt liquors,) and relates to that class of internal spherical stoppers formed of glass, earthenware, or other like vitreous material which has inherently a greater specific gravity than water, and which stoppers close the bottle when it is filled by being forced by the pressure within the bottle against an elastic seat consisting of a ring of india-rubber or other suitable material placed in a groove formed in the interior of the neck of the bottle.

Instead of forming such spherical stoppers solid, as hitherto, I form them with a closed hollow space inside them, of such dimensions that instead of being of greater specific gravity than water they shall be sufficiently buoyant to float on the liquid contained in the bottle, whereby I obviate some of the objections to the employment of this class of stoppers. Among these objections may be mentioned, that if the solid ball (made of glass or earthenware) be allowed to fall to the bottom of the bottle when the bottle is opened there is great risk of either the bottle or ball starring or breaking, and therefore it is necessary to contract the lower part of the neck of the bottle; and, further, in order to prevent the ball rolling back to the mouth of the bottle when the liquid is poured out, it has been found necessary to form the neck of the bottle with a chamber or recess to receive the ball; but by using a hollow ball made of glass or porcelain or other suitable material which is inherently of greater specific gravity than water, as hereinbefore described, the stopper, if made sufficiently light, floats, when the bottle is opened, on the liquid instead of sinking therein, and its tendency to prevent the liquid being poured out is obviated, while the material of which it is made cannot damage the quality or flavor of the liquid, or itself be corroded or damaged thereby.

In some cases I form gravitating stoppers of hollow glass, earthenware, or other like heavy material with a hollow closed space of such dimensions as to allow them to sink slowly in the liquid, the rate of sinking being capable of being regulated by increasing or diminishing the hollow space formed in the stopper, thereby avoiding the risk of breakage to the bottle which would occur if solid stoppers made of material of greater specific gravity than water were allowed to fall to the bottom of the bottle.

When employing hollow gravitating stoppers, as hereinbefore described, I find it advantageous to form the bottom of the bottles employed therewith with a curved undercut projection, which, when the stopper falls to the bottom of the bottle, serves to keep it there while the liquid is being poured out.

Figure 1:
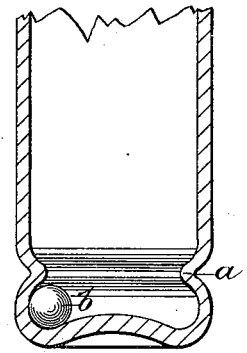

In the accompanying drawings, Figure 1 is a sectional elevation, showing the bottom part of a bottle so formed, *a* being the projection, and *b* the stopper; but I make no claim to this form of bottle.

I am aware that it has been before proposed to employ internal floating stoppers made of soft elastic material, and of hollow vessels made of sheet metal; but such stoppers have not been found of practical use, in consequence of the difficulty of bringing them into their seat when the bottle has been filled, and also from the fact that they are liable to be blown out of the bottle from the effect of the internal pressure, and for other objections found to occur in practice.

In Fig. 2 of the accompanying drawings *c* shows a central depression formed in the inner surface of the bottom of the bottle, and into which the stopper may fall when the bottle is empty, and from which it may be readily brought to its seat in the neck of the bottle by any appropriate lifting device, and without the waste of liquid and escape of gas, which now usually takes place, whether a floating or a sinkable stopper be used.

Figure 3:

Fig. 3 illustrates a section of the hollow stopper.

Having thus described the nature of my said invention and the best means with which I am acquainted for carrying the same into effect, I would have it understood that I do not confine myself to the precise details herein laid down and shown in the accompanying drawings, as the same may be varied without departing from the peculiar character of my invention; but

What I claim is—

An internal bottle-stopper consisting of a hollow sphere composed of vitreous material having inherently a greater specific gravity than water, as hereinbefore described.

H. BARRETT.

Witnesses:
G. F. REDFERN,
A. S. WATT.